United States Patent [19]

Strauss et al.

[11] Patent Number: 5,278,454
[45] Date of Patent: Jan. 11, 1994

[54] EMERGENCY CAPACITIVE ENERGY SOURCE AND CIRCUIT FOR DAMPER MOTORS AND ACTUATOR MOTORS

[75] Inventors: Jason Strauss, Ft. Lauderdale; Brian J. Wheeler, Sunrise; Michael Ginzburg, Ft. Lauderdale, all of Fla.; Zev Kopel, Dollard Des Ormeaux, Canada

[73] Assignee: National Environmental Products Ltd., Inc., Sunrise, Fla.

[21] Appl. No.: 901,746

[22] Filed: Jun. 22, 1992

[51] Int. Cl.$^5$ .............................. H02J 9/00
[52] U.S. Cl. ............................. 307/64; 307/66
[58] Field of Search .................. 307/64, 65, 68; 318/105, 106, 108, 109, 139, 440, 442

Primary Examiner—Jeffrey A. Gaffin
Attorney, Agent, or Firm—Robert C. Kain, Jr.

[57] ABSTRACT

The emergency, fail safe capacitive energy source and circuit is used in conjunction with an air damper actuator or a valve actuator. In particular, the capacitive energy source and circuit powers a fractional horsepower motor and both the motor as well as the capacitive energy source and circuit are completely contained within an actuator container of a relatively small size. The capacitive energy source and circuit include at least one high storage capacitor (rated 0.047 farads or higher) having a volumetric size not exceeding 30 cubic inches. Preferably, a bank of high value capacitors are utilized wherein the capacitors are coupled in series or parallel to power the AC or DC motor and associated circuitry. The capacitive energy source and circuit also includes a charging circuit coupled between the motor drive power source and the capacitor or bank of capacitors. A sensor is coupled to the motor drive power source and generates a control signal in the absence of power from the motor drive power source. A switch, controlled by the control signal, is coupled to the motor drive power source and is also coupled to the capacitor or bank of capacitors. The switch has a switched output coupled to the motor. The switch passes power from the motor drive power source to the motor in the absence of the control signal from the sensor and passes power from the capacitor or bank of capacitors in the presence of the control signal. In a preferred embodiment, the sensor is a coil of DC operated relay and the switch embodied by the relay contacts and is actuated by the relay coil.

10 Claims, 3 Drawing Sheets

EMERGENCY CAPACITIVE ENERGY SOURCE AND CIRCUIT FOR DAMPER MOTORS AND ACTUATOR MOTORS

BACKGROUND OF THE INVENTION

The present invention relates to an emergency capacitive energy source and circuit for fractional horsepower motors used as damper motors or as actuator motors.

Electric or electronic damper motors are utilized to open and close fresh air dampers, supply air dampers, smoke control dampers, return air dampers, relief dampers, fan vortex dampers, exhaust air dampers and fire dampers. These dampers are utilized to control the flow of air through air ducts. Other types of dampers are categorized as variable air volume terminal unit dampers, constant air volume terminal unit dampers, two position terminal unit dampers, fume hood supply and exhaust dampers and clean room supply and exhaust dampers. Again, these dampers are used to open and close vents in air ducts. Typically, the damper includes a motor which rotates a drive mechanism to open, close or position the air vents to certain locations thereby controlling the air flow through the duct work. Sometimes, the rotative movement of the motor is converted into linear movement thereby providing a linear damper actuator.

Valve actuators are generally classified as rotary valve actuators or linear push-pull valve actuators. Several types of valves can be controlled by such valve actuators. For example, two-way ball valves, three-way ball valves, two-way globe valves, three-way globe valves, two-way plug valves, three-way plug valves, butterfly valves, rotary delta P valves and shoe valves. Essentially, valve actuators convert a control signal into a valve drive signal which affects a motor in the actuator thereby mechanically changing the mechanical position of the valve stem control.

In many systems, it is commonplace to include a fail safe sub-system which closes or opens the damper or the valve in the event power is cut to the damper or valve actuator circuit or motor. For example, with respect to air dampers, it is a relatively common requirement that such air dampers be equipped with a fail safe system whereby, in the event that power is cut to the damper, the air vents are moved to a closed position to eliminate or reduce the probability that fire may spread within the building due to the open or partially open air ducts. In the past, these fail safe systems have included mechanical springs which automatically close the air vents or an independent hydraulic system which automatically close the air vents if power is cut to the motor controlling the air damper actuator. Since these fail safe systems must remain operable for a considerable length of time (2-10 years), it is critical that the fail safe system operates properly in the event that power to the damper actuator is cut off. Mechanical and hydraulic fail safe systems are subject to wear and tear and deterioration due to the somewhat continually opening and closing action of the air vents in the damper itself. If the dampers remain in an open or a closed position for a considerable period of time, the springs in a mechanical actuator may lose their retractive or compressive force or become mechanically damaged due to environmental conditions. Hydraulic fail safe systems are subject to leakage and corrosion due to environmental conditions.

It is sometimes necessary to include fail safe systems in valve actuators. For example, if the hydronic system is carrying hot or chilled water under system pressure, it may be necessary to include a fail safe system in the valve actuator. The valve actuator controls the flow of the water through the valve and through the hydronic system. In the event the control or drive signal applied to the valve actuator is cut off for any reason, the fail safe system would open or close the valve as required by design specifications. For hydronic systems, a fail safe "close" or "open" position may be required by the design specifications. Again, mechanical or hydraulic fail safe systems have been developed which automatically close the valve actuator and hence the valve if the drive signal for the valve actuator is cut off for any reason. Mechanical and hydraulic fail safe systems are subject to the same defects as specified above with respect to air dampers.

Air dampers and valve actuator motors are normally fractional horsepower AC or DC drive motors. These motors are sometimes called low output motors rather than fractional horsepower motors. A typical rating for these motors is up to 10 ounce inches of torque at maximum efficiency. Typical power consumption in the stall mode is up to 200 milliamps.

In addition, air damper actuators and valve actuators are normally relatively small components. A typical air damper actuator is sized about 6"×6"×10", not including its actuator arm, whether that arm is a linear actuator or a rotatable actuator. Valve actuators are similarly sized.

The control signals or drive signals customarily utilized in these air handling systems or hydronic systems are AC or DC control and drive signals. Accordingly, electronic or electric circuitry is associated with the air damper actuators and valve actuators which process analog and digital control signals. In some cases, the signal utilized to control the valve or the air damper is the same signal that is utilized to drive the actuator. For example, if a damper actuator was to be moved in a counterclockwise direction, an AC signal would be applied to the counterclockwise drive control line (CCWDRV). At another time, a clockwise drive power control signal (CWDRV) would be applied to the actuator. Accordingly, air damper actuators and valve actuators are relatively simple devices that are utilized at multiple locations in any given air handling system or hydronic system.

OBJECTS OF THE INVENTION

It is an object of the present invention to provide an emergency, fail safe capacitive energy source and circuit for fractional horsepower motors used in air damper actuators or in valve actuators.

It is another object of the present invention to provide high storage capacity capacitors (0.047 farads or higher) as the energy source in the fail safe circuitry.

It is a further object of the present invention to provide a simple sensor/switch that senses the presence or absence of a control/drive signal or a power signal and applies power from the capacitive power source to the motor if the normal power drive signals are cut off.

It is an additional object of the present invention to provide a capacitive power source for air damper actuators and valve actuators which are extremely compact and yet are capable of powering fail safe electric circuitry to drive the damper or valve to a fail safe position.

SUMMARY OF THE INVENTION

The emergency, fail safe capacitive energy source and circuit is used in conjunction with an air damper actuator or a valve actuator. In particular, the capacitive energy source and circuit powers fractional horsepower AC or DC motors and both the motor as well as the capacitive energy source and circuit are completely contained within an actuator container of a relatively small size. The capacitive energy source and circuit include at least one high storage capacitor (rated 0.047 farads or higher) having a volumetric size not exceeding 30 cubic inches. One high value capacitor or a bank of high value capacitors are utilized wherein the capacitors are coupled in series or parallel to power the AC or DC motor and associated circuitry. The capacitive energy source and circuit also includes a charging circuit coupled between the motor drive power source and the capacitor or bank of capacitors. A sensor is coupled to the motor drive power source and generates a control signal in the absence of power from the motor drive power source. A switch, controlled by the control signal, is coupled to the motor drive power source and is also coupled to the capacitor or bank of capacitors. The switch has a switched output coupled to the motor. The switch passes power from the motor drive power source to the motor in the absence of the control signal from the sensor and passes power from the capacitor or bank of capacitors in the presence of the control signal. In a preferred embodiment, the sensor is a coil of DC operated relay and the switch embodied by the relay contacts and is actuated by the relay coil.

BRIEF DESCRIPTION OF DRAWINGS

Further objects and advantages of the present invention can be found in the detailed description of the preferred embodiment when taken in conjunction with the accompanying drawings in which.

DETAILED DESCRIPTION OF ONE OF THE PREFERRED EMBODIMENTS

The present invention relates to an emergency, fail safe, capacitive energy source and circuit for an air damper actuator or a valve actuator.

Figure 1:
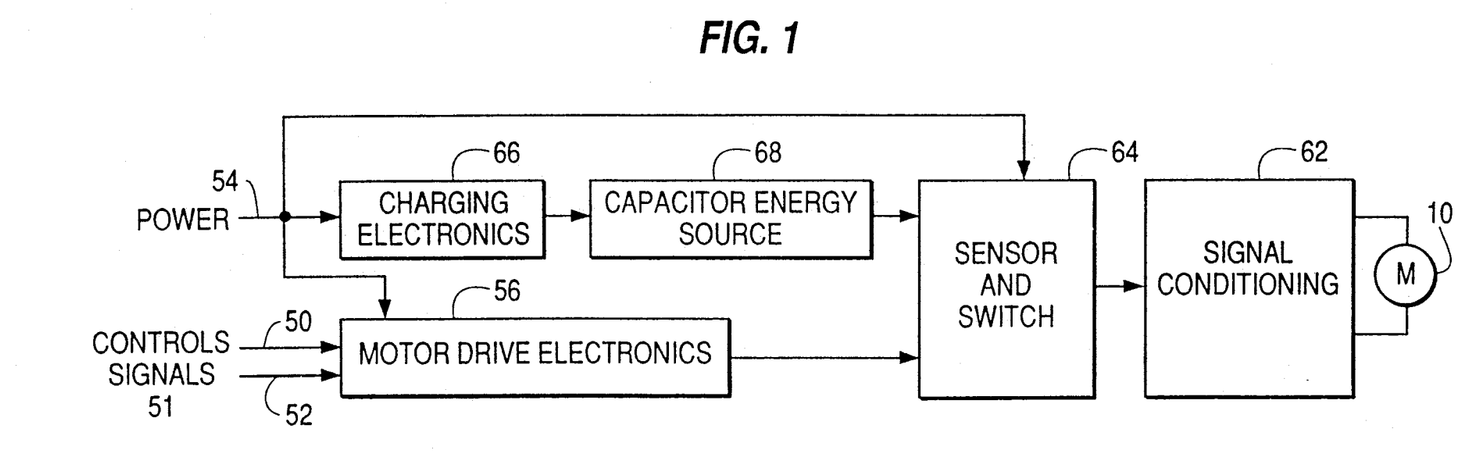
FIG. 1 diagrammatically illustrates a block diagram showing the electronics for the actuator circuit and the capacitive energy source and circuit.
Figure 2:
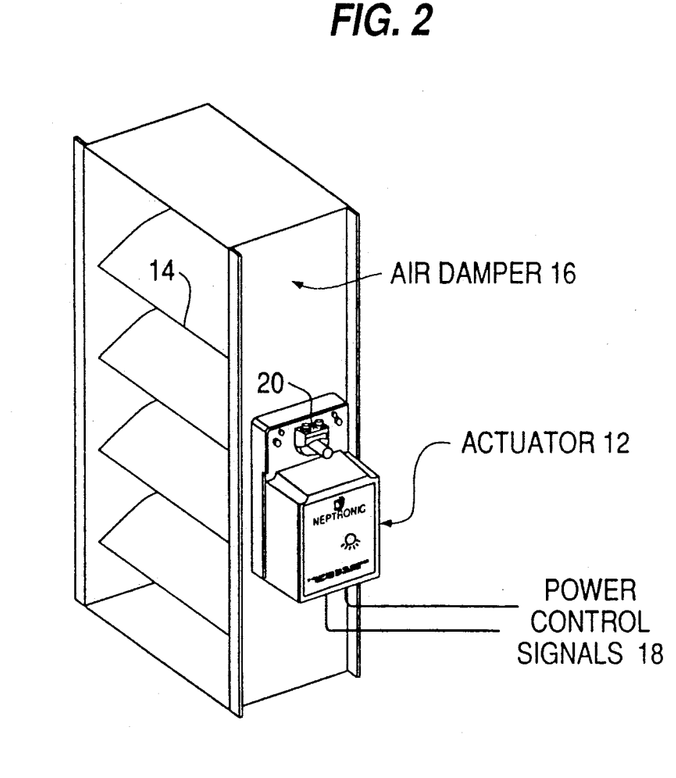
FIG. 2 diagrammatically illustrates an air damper and the associated damper actuator.

FIG. 1 is a block diagram illustrating electronics for driving AC or DC motor 10 which is used to move air vents in an air damper or a valve stem or valve control rod in a valve actuator. FIG. 2 diagrammatically illustrates air damper actuator 12 which opens and closes air vents 14 in damper 16. Damper 16 is installed in an air duct. Power and control signals 18 are applied to actuator 12. A motor in actuator 12 imparts either linear or rotative movement to actuator arm 20, thereby changing the position of air vents 14 in damper 16.

Figure 3:
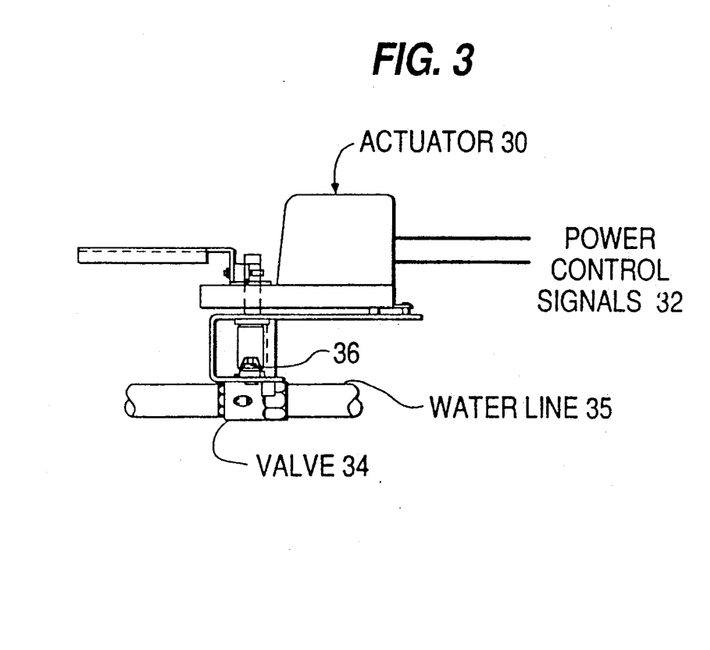
FIG. 3 diagrammatically illustrates a valve in an hydronic system and its associated actuator.

Motor 10 (FIG. 1) can also be incorporated within valve actuator 30 shown in FIG. 3. Power or control signals 32 are applied to valve actuator 30. Either rotative or linear mechanical movement is applied to valve 34 via mechanical linkage 36. This mechanical action positions the valve control stem and regulates flow through the valve and ultimately through water line 35.

Returning to FIG. 1, an actuator would be supplied with a one or more drive signals, for example a counterclockwise drive signal, CCWDRV, on line 50, and a second drive signal, such as a clockwise drive signal, CWDRV, on line 52. Of course, if linear mechanical motion was required to move air damper 16 or valve 34, the drive signal on line 50 may be designated as a push drive or a left drive, whereas the drive signal applied to line 52 may be characterized as a pull drive or a right drive signal. At the option of the system designer, the actuator may also be fed power that is continuously applied to line 54. As stated above, the control-power signals on lines 50, 52 and 54 are customarily AC signals.

Control signals 51 are fed to motor drive electronics 56 as is power from line 54. Motor drive electronics 56 processes the control signals such that the signals affect the power applied to motor 10 to drive the motor and the air damper or valve to a desired position. The output of drive electronics 56 is applied to a sensor and switch unit 64. Under normal operating conditions, i.e. not a "fail" mode, the motor control signals pass through unit 64 to a signal conditioning unit 62. The signal conditioning unit further converts the signals such that motor 10 moves in response thereto.

Sensor and switch unit 64 monitors the presence or absence of a signal on the power line 54. In the absence of power, unit 64 switches the power source from line 54 to charged capacitor energy source 68. Energy source 68 is charged by charging electronics 66 coupled between energy source 68 and power line 54. In some instances, control signals 51 are also power signals. Hence, sensor unit 64 is coupled such that it monitors lines 50, 52. The sensor generates a control signal which controls the switch in unit 64.

The sensor in unit 64 could be configured as a voltage, current or power sensor with comparators or other electronic devices or could simply be configured as a coil in a DC operated relay, as described below. If the actuator motor is an AC motor, the signal conditioning unit 62 includes an invertor circuit to convert the DC output voltage from capacitor storage 68 into an AC power supply. In addition, if sensor and switch unit 64 is configured as a relay, an AC operated coil for the relay would be coupled to power line 54.

Figure 4:
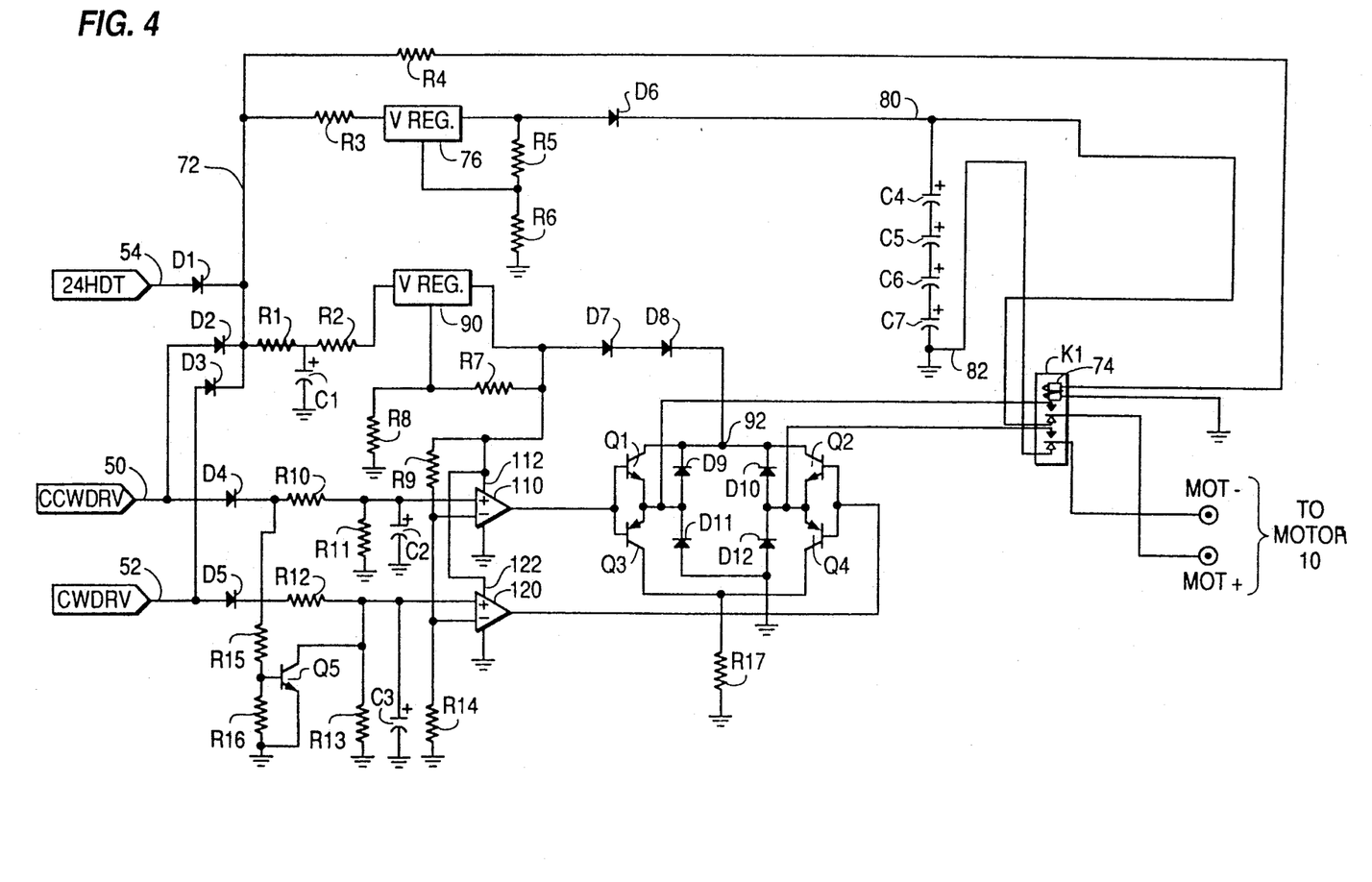
FIG. 4 schematically illustrates the actuator circuit and capacitive energy source and circuit.

FIG. 4 schematically illustrates one embodiment of the capacitive energy source and circuit as well as the electronic circuit associated with the actuator motor. Power line 54 is illustrated in FIG. 4 along with control/drive lines 50 and 52. As stated earlier, the designer may decide to connect the actuator electronics directly to the AC power line in addition to connecting the actuator circuit to the CCWDRV line 50 and the CWDRV line 52. The designer may decide not to connect power 54 to the actuator circuitry. If so, the designer would require a control/drive signal to be present at all times on one of the lines 50, 52. In a working embodiment, 24 volts AC is applied to power line 54 and is selectively applied as a control/drive signal to the counterclockwise drive line 50 or the clockwise drive line 52. Starting from power line 54, diode D1 partially converts the AC power to a positive sine wave. This signal at the output of diode D1 is fed to a filter consisting of resistor R1 and capacitor C1. R1=10 ohms; C1=470 microfarads. The R1-C1 filter is charged during the positive sine wave passed by diode D1 and during the time of a negative sine wave when diode D1 is not conducting, capacitor C1 discharges thereby supplying an unsmoothed DC signal on line 72. In this embodiment, the voltage on line 72 is approximately 32 volts DC (the peak value of 24 volts AC). Resistor R4 (1 k ohms) provides some voltage drop to that signal which is ultimately fed to relay K1 and particularly DC coil 74 in that relay. DC coil 74 is a sensor which senses the presence of power on line 72 and ultimately on power line 54.

The counterclockwise drive signal CCWDRV on line 50 is fed through diode D2 to line 72 and the clockwise drive signal CWDRV on line 52 is fed through diode D3 to line 72. The R1-C1 filter operates in a similar manner and generates an unsmoothed DC voltage on line 72. Accordingly, relay coil 74 senses the presence or absence of a motor drive power source on lines 50, 52 and 54 and changes the state of relay K1 by generating a control signal in the absence of power on line 54 or the control-power signal on lines 50 and 52. Relay K1 in FIG. 4 is shown in its activated state or in the "fail" state when a control signal is generated by relay coil 74. The unsmoothed DC signal from line 72 is fed through resistor R3 into a voltage regulator 76. Voltage regulator 76 further smooths the voltage, sets the appropriate voltage level and provides a charging circuit for the bank of capacitors C4, C5, C6 and C7. Resistors R5 and R6 adjust the regulator and establish the voltage level at the output of voltage regulator 76. Diode D6, coupled to the output of voltage regulator 76, blocks any feedback voltage from capacitor bank consisting of C4, C5, C6 and C7 when the output of the voltage regulator 76 falls below the voltage level established by the charged capacitor bank. This may occur at the onset of a power failure on lines 50, 52 and 54.

Capacitors C4, C5, C6 and C7 are an important part of the present invention. Each of these capacitors has an extremely high capacitive rating, a rating exceeding 0.5 farads and yet each capacitor is relatively small, that is, each capacitor has a volumetric size not exceeding 2.0 square inches. These capacitors are available from NEC and are sold under the trademark SUPERCAP. Preferably, capacitors of the FY series are used, and particularly SUPERCAP Model Nos. FYD0H225Z. Each of these capacitors, C4-C7, are rated as 2.2 farads capacitors and have a maximum storage capacity of 5.5 volts. These capacitors are essentially cylindrical having a diameter of 1.122" and a height of 0.866" not including the height of the connector pins. Accordingly, a bank of capacitors can be linked together in series to provide a nominal rated voltage to drive motor 10 in the event power is lost on lines 50, 52 and 54. In a working embodiment, motor 10 is a 24 volt DC motor manufactured by Mabuchi as Model No. RF370C081150. The torque output of this motor is 0.28 ounce inches at maximum efficiency. Power consumption in the stall mode is 120 milliamps at 20 v DC. By utilizing a bank of series coupled capacitors C4-C7 each having a relatively high rating (2.2 farads apiece), a total of 22 volts can be generated between positive bank power line 80 and negative bank power line 82 (ground). The total capacitance across the bank of capacitors C4-C7 is 0.55 farads.

As discussed earlier, the sensor and switch configured as relay K1 is illustrated in its fail safe mode whereby capacitors C4-C7 are discharging their electrical energy through relay K1 to motor 10. Of course, if motor 10 were to be driven in a counterclockwise direction, the designer of the system would ensure that the proper DC voltage was applied to the proper terminal on the drive motor. In a preferred embodiment, positive or negative power is supplied to motor 10 based upon the positioning of jumpers on a terminal block (not illustrated) interposed between lines 80 and 82 and relay K1.

If motor 10 requires less voltage, the number of capacitors can be reduced to three capacitors. If three capacitors are used, the resistive value of R3 is 200 ohms rated at 3 watts. If four capacitors are used, R3 is a 120 ohm, 3 watt resistor.

Filter C1-R2 is also coupled to resistor R2 which simply drops the voltage level applied to voltage regulator 90. The output of voltage regulator 90 is established by the voltage divider circuit R7 and R8. Diodes D7 and D8 are coupled to the output of voltage regulator 90 to provide some voltage drop to the power signal applied at input 92 of the power bridge configured as transistors Q1, Q2, Q3 and Q4. Diodes D9, D10, D11 and D12 operate as surge protectors to protect the bridge from reverse power surges from the motor. When the DC motor changes direction, there is potentially a surge of power from the motor back to the power bridge. Diodes D9-D12 protect transistors Q1-Q4 from this power surge.

Coupled to drive power line 50 is a diode D4 which converts the AC signal to a positive sine wave DC signal. Resistors R10, R11 provide a voltage divider network. Capacitor C2 acts as a filter and a pump to insert a DC level back to the signal during the time periods between the positive sine waves developed by diode D4. This unsmoothed DC signal is applied to a comparator 110 and particularly to the positive terminal of the comparator. Preferably, comparator 110 is an op amp which is sold as Model No. LM358D. Voltage regulators 76 and 90 are Model Nos. LM317. Power is supplied to comparator 110 at pin 112 which is coupled to the output of regulator 90. The DC level applied to positive input terminal of comparator 110 is compared with the level at negative terminal which is obtained through a voltage divider circuit consisting of R9 and R14 coupled to the output of voltage regulator 90, that is, the primary source of power and control to motor 10. The output of comparator 110 is either high or low and that signal is applied to the base control input of transistors Q1 and Q3. Accordingly, comparator 110 is a level shifter which is used simply to drive transistors Q1 and Q3 to pass the appropriately smoothed and regulated DC voltage to motor 10.

The output of diode D4 is also connected to a voltage divider circuit consisting of R15 and R16. The mid point of that voltage divider circuit is connected to the base of transistor Q5. The collector of transistor Q5 is coupled to the mid point of a voltage divider circuit consisting of resistors R12 and R13. Capacitor C3 acts as a pump to provide a unsmoothed DC signal to the positive input of comparator 120. The negative side of comparator 120 is coupled to the same voltage as established by the divider circuit of R9 and R14. Power is supplied to comparator 120 at power pin 122 which, in turn, is coupled to the power input pin 112 of comparator 110. Transistor Q5 operates as an input signal override to select CCWDRV over CWDRV. If a switchover from or to CCWDRV to CWDRV occurs, the CCWDRV signal will cause Q5 to turn on thereby grounding the CWDRV signal. The override select can be reconfigured to select CWDRV over CCWDRV.

Comparator 120 is high or low depending upon the presence or absence of a control drive signal CWDRV on line 52. The output of comparator 120 is coupled to the base of both transistors Q2 and Q4.

The storage capacity of the capacitor bank consisting of C4–C7 is quite large. The time constant established by the resistance of DC motor 10 plus other resistive elements multiplied by the capacitance of the bank exceeds 200% of the required drive voltage and time for the motor to fully close or fully open the valve or damper. For example, the charge stored in the capacitor bank drives the 24 volt DC motor for 30 seconds at maximum torque. Other types of motors, such as a 9 volt DC motor, can be utilized instead of the 24 volt DC motor. The 9 volt DC motor uses approximately 75 milliamps of power at maximum efficiency. The appropriate voltage can be obtained across lines 80 and 82 (across the capacitor bank) by changing either the size of the capacitors or decreasing the number of capacitors. For example, two capacitors rated at 2.2 farads could generate 11 volts for the 9 volt DC motor in the fail mode. The entire circuit shown in FIG. 4 is mounted on a single printed circuit board. Accordingly, the capacitors are small enough to be mounted on the PC board and in the container holding the motor and the board.

The power line sensor 69 (FIG. 1) could be coupled to the output of comparators 110 and 120 or the output of regulator 90. The signals on all these lines are indicative of the presence of a power/control signal on lines 50, 52 and 54. Additionally, digital circuitry could be used in conjunction with comparators 110 and 120 to provide an identifiable control signal. In the illustrated embodiment, the control signal is the absence of an electromagnetic field established by coil 74 in relay K1. The system may work with digital control signals, that is, CCWDRV and CWDRV could be digital control signals. In that event, power would be supplied to the motor via power line 54. The sensor (relay coil 74) would sense the power on line 54. With digital control signals, a digital control signal would be applied to one or both of lines 50, 52 and would be fed to a front end, digital processor that decodes the signal. Diodes D2, D3 would be eliminated as would op amps 110 and 120 and the associated intermediate components. Power would be fed to the motor via power line 54, regulator 90 and the power bridge consisting of transistors Q1, Q2, Q3 and Q4 and diodes D9, D10, D11 and D12.

The drive electronics could also respond to analog drive control signals. For example, the analog signal could be any signal in the 0–10 volt range. When the control signal applied to 50, 52 changes, the slope of the signal establishes the rate of change of position for the valve or air damper. Accordingly, the signal level determines the physical position of the valve or damper. The analog signal may be a voltage differential, current differential or other type of signal. With an analog drive, power must be supplied to line 54 and hence to the charging circuit (e.g., regulator 76) and DC drive circuit (e.g., regulator 90 and the power bridge Q1, etc.). The circuit would include a front end analog processor. The front end signal processor would replace diodes D2, D3, op amps 110, 120 and associated intermediate circuitry with circuitry to transform the analog control signals to drive signals for controlling power bridge transistors Q1, Q2, Q3, Q4 and hence motor 10.

The claims appended hereto are meant to cover modifications and changes within the spirit and scope of the present invention.

What is claimed is:

1. An emergency, fail-safe capacitive energy source and circuit for a fractional horsepower motor used in an air damper actuator motor or in a valve actuator motor and coupled to a motor drive power source, said capacitive energy source and circuit and motor completely contained within a container no larger than 6"×6"×10", said capacitive energy source and circuit comprising:

at least one capacitor rated 0.047 farads or higher and having a volumetric size not exceeding 30 cubic inches;

a charging circuit coupled between said motor drive power source and said capacitor;

means for sensing the presence of power from said motor drive power source, said means for sensing generating a control signal in the absence of said power from said motor drive power source; and, a switch controlled by said control signal and coupled to said motor drive power source and said capacitor and having a switched output coupled to said motor, said switch passes power from said motor drive power source to said motor in the absence of said control signal and passes power from said capacitor to said motor in the presence of said control signal.

2. A capacitive energy source and circuit as claimed in claim 1 wherein a bank of capacitors are coupled together to power said motor.

3. A capacitive energy source and circuit as claimed in claim 2 wherein each capacitor in said bank is rated 0.047 farads or higher.

4. A capacitive energy source and circuit as claimed in claim 1 wherein the means for sensing includes a coil of a relay and said switch is a relay having a switched output controlled by said coil.

5. An emergency, fail-safe capacitive energy source and circuit for a fractional horsepower motor used in an air damper actuator motor or in a valve actuator motor and coupled to a motor drive power source, said capacitive energy source and circuit comprising:

at least one capacitor rated 0.047 farads or higher and having a volumetric size not exceeding 30 cubic inches;

a charging circuit coupled between said motor drive power source and said capacitor;

means for sensing the presence of power from said motor drive power source, said means for sensing generating a control signal in the absence of said power from said motor drive power source; and, a switch controlled by said control signal and coupled to said motor drive power source and said capacitor and having a switched output coupled to said motor, said switch passes power from said motor drive power source to said motor in the absence of said control signal and passes power from said capacitor to said motor in the presence of said control signal.

6. A capacitive energy source and circuit as claimed in claim 5 wherein a bank of capacitors are coupled together to power said motor.

7. A capacitive energy source and circuit as claimed in claim 6 wherein each capacitor in said bank is rated 0.047 farads or higher.

8. A capacitive energy source and circuit as claimed in claim 5 wherein said capacitor, said means for sensing and said switch are mounted in a single enclosure.

9. An emergency, fail-safe capacitive energy source and circuit for a fractional horsepower motor used in an air damper actuator motor or in a valve actuator motor and coupled to a motor drive power source, said motor having a predetermined drive voltage and time to place said air damper or said valve in a fail safe position, said capacitive energy source and circuit comprising:
- at least one capacitor rated 0.047 farads or higher and having a volumetric size not exceeding 30 cubic inches;
- a charging circuit coupled between said motor drive power source and said capacitor;
- means for sensing the presence of power from said motor drive power source, said means for sensing generating a control signal in the absence of said power from said motor drive power source; and,
- a switch controlled by said control signal and coupled to said motor drive power source and said capacitor and having a switched output coupled to said motor, said switch passes power from said motor drive power source to said motor in the absence of said control signal and passes power from said capacitor to said motor in the presence of said control signal;
- wherein a time constant established by a total resistance of said motor plus other intervening resistive elements multiplied by the capacitance of said capacitor exceeds said predetermined drive voltage and time to place said air damper or said valve in said fail safe position.

10. In combination with a fractional horsepower motor used as an air damper actuator motor or as a valve actuator motor and coupled to a motor drive power source, an improved emergency fail-safe circuit coupled to said motor, said fail-safe circuit being completely contained within a container no larger than 6"×6"×10", said improvement comprising:
- at least one capacitor rated 0.047 farads or higher and having a volumetric size not exceeding 30 cubic inches;
- a charging circuit coupled between said motor drive power source and said capacitor;
- means for sensing the presence of power from said motor drive power source, said means for sensing generating a control signal in the absence of said power from said motor drive power source; and
- a switch controlled by said control signal and coupled to said motor drive power source and said capacitor and having a switched output coupled to said motor, said switch passes power from said motor drive power source to said motor in the absence of said control signal and passes power from said capacitor to said motor in the presence of said control signal.

* * * * *

REEXAMINATION CERTIFICATE (2589th)
United States Patent [19]
Strauss et al.

[11] B1 5,278,454
[45] Certificate Issued  May 23, 1995

[54] EMERGENCY CAPACITIVE ENERGY SOURCE AND CIRCUIT FOR DAMPER MOTORS AND ACTUATOR MOTORS

[75] Inventors: Jason Strauss, Ft. Lauderdale; Brian J. Wheeler, Sunrise; Michael Ginzburg, Ft. Lauderdale, all of Fla.; Zev Kopel, Dollard Des Ormeaux, Canada

[73] Assignee: National Environment Products, Ltd., Sunrise, Fla.

Reexamination Request:
No. 90/003,504, Jul. 21, 1994

Reexamination Certificate for:
Patent No.: 5,278,454
Issued: Jan. 11, 1994
Appl. No.: 901,746
Filed: Jun. 22, 1992

[51] Int. Cl.$^6$ .............................. H02J 9/00
[52] U.S. Cl. .......................... 307/64; 307/66
[58] Field of Search ................. 307/64, 65, 66; 318/105, 106, 108, 109, 139, 440, 442

[56] References Cited
U.S. PATENT DOCUMENTS
5,012,121  4/1991  Hammond et al. .............. 307/64

OTHER PUBLICATIONS

NEC User's Manual for SUPERCAP, Dec., 1989, Doc. No. OEP-1004F.
Honeywell Product Specification M784/6, M886, M984/6 Versadrive Damper Acutators, 1990.
Valcron Advertisement in Thomas Register, 1990.
NEC SUPERCAP Application Note, Oct., 1989, Doc. No. OEA-10007A.
Webster's Ninth New Collegiate Dictionary, Published 1984, pp. 54, 445.
Electromagnetic and Electromechanical Machines by L. Matsch, published 1972, pp. 412–431, Intext Educational Publishers.

Primary Examiner—Jeffrey A. Gaffin

[57] ABSTRACT

The emergency, fail safe capacitive energy source and circuit is used in conjunction with an air damper actuator or a valve actuator. In particular, the capacitive energy source and circuit powers a fractional horsepower motor and both the motor as well as the capacitive energy source and circuit are completely contained within an actuator container of a relatively small size. The capacitive energy source and circuit include at least one high storage capacitor (rated 0.047 farads or higher) having a volumetric size not exceeding 30 cubic inches. Preferably, a bank of high value capacitors are utilized wherein the capacitors are coupled in series or parallel to power the AC or DC motor and associated circuitry. The capacitive energy source and circuit also includes a charging circuit coupled between the motor drive power source and the capacitor or bank of capacitors. A sensor is coupled to the motor drive power source and generates a control signal in the absence of power from the motor drive power source. A switch, controlled by the control signal, is coupled to the motor drive power source and is also coupled to the capacitor or bank of capacitors. The switch has a switched output coupled to the motor. The switch passes power from the motor drive power source to the motor in the absence of the control signal from the sensor and passes power from the capacitor or bank of capacitors in the presence of the control signal. In a preferred embodiment, the sensor is a coil of DC operated relay and the switch embodied by the relay contacts and is actuated by the relay coil.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 9 is confirmed.

Claims 1, 5 and 10 are determined to be patentable as amended.

Claims 2-4 and 6-8, dependent on an amended claim, are determined to be patentable.

1. An emergency, fail-safe capacitive energy source and circuit for a fractional horsepower motor used in an air damper actuator motor or in a valve actuator motor and coupled to a motor drive power source, *said motor having a predetermined drive voltage and time to place said air damper or said valve in a fail-safe position,* said capacitive energy source and circuit and motor completely contained within a container no larger than 6"×6"×10", said capacitive energy source and circuit comprising:
    at least one capacitor rated 0.047 farads or higher and having a volumetric size not exceeding 30 cubic inches;
    a charging circuit coupled between said motor drive power source and said capacitor;
    means for sensing the presence of power from said motor drive power source, said means for sensing generating a control signal in the absence of said power from said motor drive power source; and,
    a switch controlled by said control signal and coupled to said motor drive power source and said capacitor and having a switched output coupled to said motor, said switch passes power from said motor drive power source to said motor in the absence of said control signal and passes power from said capacitor to said motor in the presence of said control signal, *wherein a time constant established by a total resistance of said motor plus other intervening resistive elements multiplied by the capacitance of said capacitor exceeds said predetermined drive voltage and time to place said air damper or said valve in said fail-safe position.*

5. An emergency, fail-safe capacitive energy source and circuit for a fractional horsepower motor used in an air damper actuator motor or in a valve actuator motor and coupled to a motor drive power source, *said motor having a predetermined drive voltage and time to place said air damper or said valve in a fail-safe position,* said capacitive energy source and circuit comprising:
    at least one capacitor rated 0.047 farads or higher and having a volumetric size not exceeding 30 cubic inches;
    a charging circuit coupled between said motor drive power source and said capacitor;
    means for sensing the presence of power from said motor drive power source, said means for sensing generating a control signal in the absence of said power from said motor drive power source; and,
    a switch controlled by said control signal and coupled to said motor drive power source and said capacitor and having a switched output coupled to said motor, said switch passes power from said motor drive power source to said motor in the absence of said control signal and passes power from said capacitor to said motor in the presence of said control signal, *wherein a time constant established by a total resistance of said motor plus other intervening resistive elements multiplied by the capacitance of said capacitor exceeds said predetermined drive voltage and time to place said air damper or said valve in said fail-safe position.*

10. In combination with a fractional horsepower motor used as an air damper actuator motor or as a valve actuator motor and coupled to a motor drive power source, an improved emergency fail-safe circuit coupled to said motor, *said motor having a predetermined drive voltage and time to place said air damper or said valve in a fail-safe position,* said fail-safe circuit being completely contained within a container no larger than 6"×6"×10", said improvement comprising:
    at least one capacitor rated 0.047 farads or higher and having a volumetric size not exceeding 30 cubic inches;
    a charging circuit coupled between said motor drive power source and said capacitor;
    means for sensing the presence of power from said motor drive power source, said means for sensing generating a control signal in the absence of said power from said motor drive power source; and,
    a switch controlled by said control signal and coupled to said motor drive power source and said capacitor and having a switched output coupled to said motor, said switch passes power from said motor drive power source to said motor in the absence of said control signal and passes power from said capacitor to said motor in the presence of said control signal, *wherein a time constant established by a total resistance of said motor plus other intervening resistive elements multiplied by the capacitance of said capacitor exceeds said predetermined drive voltage and time to place said air damper or said valve in said fail-safe position.*

* * * * *